(No Model.) 2 Sheets—Sheet 1.
W. R. WILBUR.
MACHINE FOR PROVIDING BOLTS OR SCREWS WITH THREADED OR GIMLET POINTS.
No. 509,638. Patented Nov. 28, 1893.
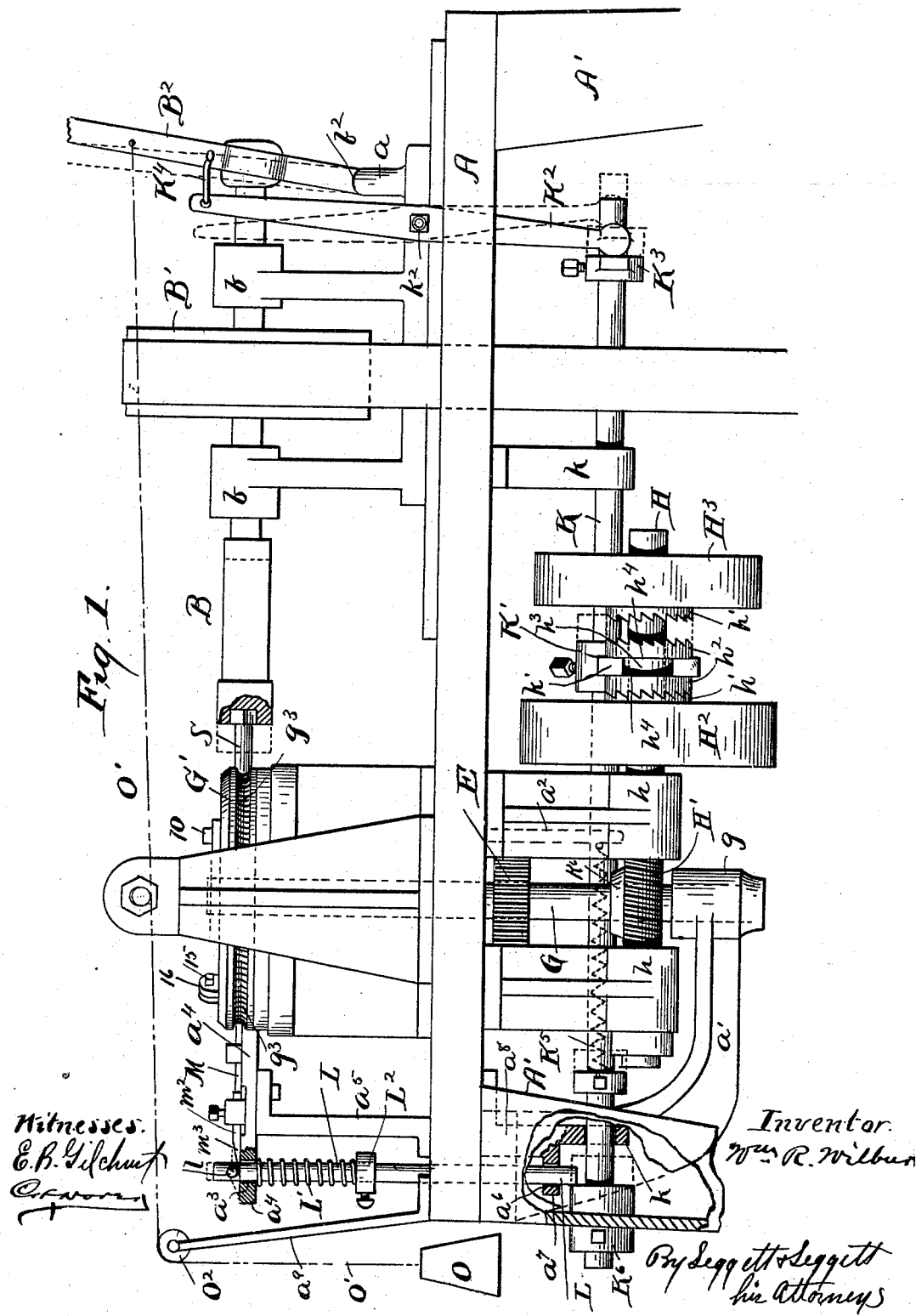
Witnesses.
E. B. Gilchrist
Inventor.
Wm. R. Wilbur
By Leggett & Leggett
his Attorneys (No Model.) 2 Sheets—Sheet 2.
W. R. WILBUR.
MACHINE FOR PROVIDING BOLTS OR SCREWS WITH THREADED OR GIMLET POINTS.
No. 509,638. Patented Nov. 28, 1893.
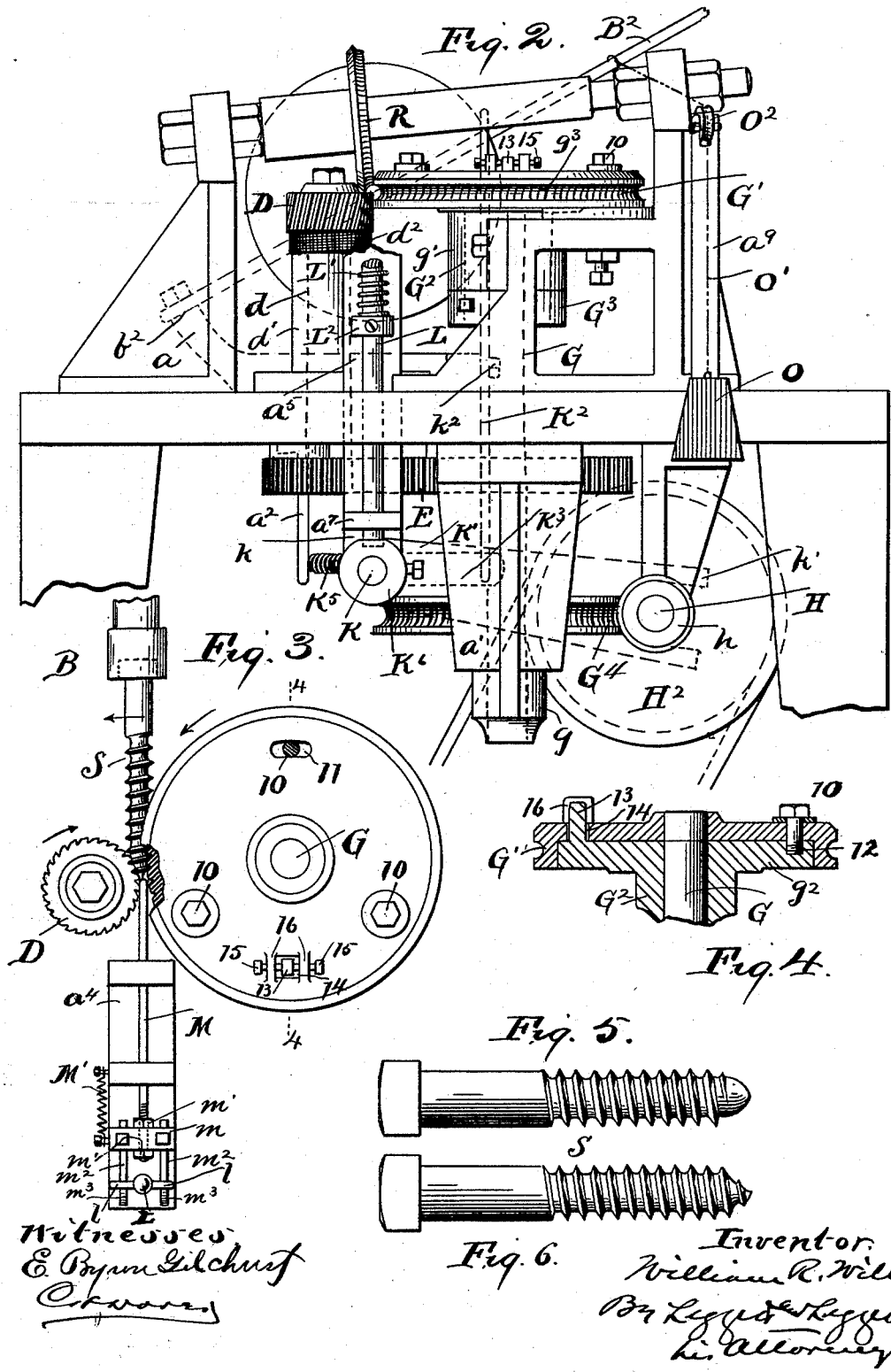

UNITED STATES PATENT OFFICE.

WILLIAM R. WILBUR, OF CLEVELAND, OHIO.

MACHINE FOR PROVIDING BOLTS OR SCREWS WITH THREADED OR GIMLET POINTS.

SPECIFICATION forming part of Letters Patent No. 509,638, dated November 28, 1893.

Application filed May 1, 1893. Serial No. 472,566. (No model.)

*To all whom it may concern:*

Be it known that I, WILLIAM R. WILBUR, of Cleveland, in the county of Cuyahoga and State of Ohio, have invented certain new and useful Improvements in Machines for Providing Bolts or Screws with Threaded or Gimlet Points; and I hereby declare the following to be a full, clear, and exact description of the invention, such as will enable others skilled in the art to which it pertains to make and use the same.

My invention relates to improvements in machines for providing bolts or screws with threaded or gimlet points, the object being to construct a machine that is cheaper and simpler in construction and more efficient than machines heretofore devised for the purpose.

With this object in view, my invention consists in certain features of construction and in combinations of parts hereinafter described and pointed out in the claims.

In the accompanying drawings, Figure 1 is a left-hand side elevation of a machine embodying my invention, portions being broken away and in section to more clearly show the construction. Fig. 2 is a rear end elevation, portions being broken away and in section to more clearly show the construction. Fig. 3 is a plan of a portion of the machine, the parts being shown somewhat enlarged as compared with the size of the corresponding parts in Figs. 1 and 2, and portions being broken away and in section to more clearly show the construction. Fig. 4 is a transverse section in detail on line 4—4, Fig. 3. Fig. 5 exhibits a bolt or screw, 28, before threading its point, and Fig. 6 exhibits a bolt or screw having its point threaded.

I would here remark that my improved machine, as will hereinafter appear, is especially designed for providing with threaded or gimlet points, bolts or screws whose shanks (except at the point) have already been threaded.

Referring to the drawings, A represents the bed of the machine, the same being supported upon legs, A'.

B represents the work-holding spindle that extends longitudinally of the machine and is supported at a suitable elevation, having bearing in boxes, $b$, suitably supported from the bed of the machine, the spindle being provided with a driving-pulley, B'. Spindle B, at its outer or forward end, has operatively connected therewith a hand-lever, $B^2$, that is fulcrumed, at its lower end, as at $b^2$, to an arm or bracket $a$ rigid with the supporting-bed of the machine.

The work-holding-spindle, at its inner or rear end, is of any suitable construction to adapt it to receive and hold the bolt or screw the point whereof is to be threaded or provided with a gimlet-point, and, by means of hand-lever $B^2$ the spindle is capable of being moved endwise of its bearings, as required, for the insertion of the work preparatory to the cutting or threading operation.

D represents the cutter that is operatively mounted upon the upper end of an upright shaft or spindle $d$ that (see Fig. 2) extends downwardly through the bed of the machine and has suitable bearing in a box $d'$ rigid with the bed, said shaft or spindle being supported by means of a collar, $d^2$, rigid or integral with the spindle and resting upon box $d'$. The cutter rests upon collar $d^2$ and is held against upward displacement in any well known manner.

The location of the cutter, relative to the work to be operated upon, is substantially the same as heretofore. The cutter-spindle, below the bed of the machine, is suitably intergeared, as at E, with an upright-shaft, G, that has bearing, at its lower end, in a box $g$, rigid with an arm or bracket $a'$ secured to the bottom of the machine-bed. Shaft G extends upwardly through the machine-bed, and has a guide or feed-wheel or disk, G', operatively mounted upon its upper end, the hub, $G^2$, of said wheel or disk having bearing in a box $g'$, rigid with the bed of the machine. The hub of wheel or disk G' extends below said box and has fixed thereon a collar, $G^3$, that abuts the lower end of box $g'$ and prevents upward displacement of the wheel or disk. The hub of the latter, at its upper end, is enlarged, as at $g^2$, said enlargement of the hub resting upon box $g'$ and thereby supporting shaft G.

As already indicated, my improved machine is especially adapted to thread the points of bolts or screws whose shanks have already been threaded above the point. Guide or feed-wheel G' is, therefore, threaded or toothed upon its periphery, as at $g^3$, constituting a worm-wheel the teeth whereof are adapted to mesh with the threads on the shank of the bolt or screw whose point requires to be threaded, and feed or guide the work toward the cutter, as required, the threading operation commencing at the free extremity of the point of the bolt or screw. The arrangement of parts is of course such that the cutter and feed or guide-wheel shall engage the work at opposite sides, respectively, as shown in Figs. 2 and 3, and the feed or guide-wheel-shaft and cutter-spindle are so intergeared with each other that said cutter and wheel shall rotate in opposite directions relative to each other. The work-holding spindle is independently rotated in a direction to rotate the work toward the cutting-edge of the cutter and away from the guide or feed-wheel, the direction of rotation of said parts being indicated by arrows.

Shaft G, below the bed of the machine, has operatively mounted upon it a worm-wheel, $G^4$, that meshes with a worm, H', on shaft H that is arranged longitudinally of the machine and has bearing in boxes $h$ supported from the bed of the machine above.

Upon shaft H, a suitable interval apart, are loosely mounted two driving-pulleys, $H^2$ and $H^3$, adapted to drive shaft H at different speeds, respectively, pulley $H^3$ being adapted to drive shaft H more rapidly than pulley $H^2$. The hubs of said driving-pulleys, at the ends that present toward each other, are each provided with the one half or member $h'$ of a toothed clutch. The other halves or members $h^2$ of said clutches are operatively but slidably mounted upon shaft H, and are rigid or integral with each other, being preferably rigid or integral with a sleeve, $h^3$, operatively but slidably mounted upon shaft H, by the ordinary means of groove and feather or spline (not shown) and the diameter of sleeve $h^3$ is less than that of the clutch-members, thereby forming a groove, $h^4$, between the clutch-members, which groove is engaged by the forked end $k'$ of an arm or lever, K', rigidly mounted on a sliding-rod or bar, K, that is arranged parallel with shaft H, has suitable bearing in and is capable of being slid endwise of boxes, $k$, supported from the machine-bed above. The arrangement of parts is such that lever K' shall be actuated to throw the respective clutch-member $h^2$ into engagement with the clutch-member of the one or the other of driving-pulleys $H^2$ $H^3$ according as rod or bar K, by the means hereinafter described, is slid in the one direction or the other, thereby operatively connecting the respective driving-pulley with shaft H. Now suppose that upon the operative connection of pulley $H^3$ with shaft H, feed or guide-wheel G' shall be driven so as to operate idly, that is, so as to rotate said wheel at such a speed that it will not feed the work, a speed whereby said wheel shall rotate or move one tooth or thread while the work makes a complete rotation;—then, upon the operative connection with shaft H, of pulley $H^2$, that, as already indicated, is adapted to drive slower than pulley $H^3$, the feed or guide-wheel will be rotated more slowly, or less than one tooth of the wheel during one complete rotation of the work, and consequently the work will be fed toward the cutter as required.

The arrangement of cutter, work-holding-spindle and feed-wheel or worm G' is very clearly shown in Figs. 2 and 3, and it will be observed that wheel G' not only performs the function of feeding the work toward the cutter, as already indicated, but also acts to hold the work against the cutter, and thereby prevent lateral displacement of the work from the cutter.

Sliding rod or bar K is actuated rearwardly to cause clutch-lever K' to establish operative connection between driving-pulley $H^2$ and shaft H by means of a tilting-lever $K^2$ that is fulcrumed at its central portion, as at $k^2$, to any suitable support, such, for instance, as the machine-bed. Said lever, at its lower end, engages the forward end of an arm, $K^3$, rigid on rod or bar K, and, at its opposite or upper end, is operatively connected, by means of a link $K^4$, with hand lever $B^2$. Immediately upon the completion of the cutting or threading operation, operative connection, by means hereinafter described, is automatically broken between pulley $H^2$ and shaft H and established between said shaft and pulley $H^3$. By the construction hereinbefore described it will be observed that when the point of a bolt or screw has been threaded and removed, upon the actuation of the work-holding-spindle, by means of hand-lever $B^2$, in the direction toward the operator, who stands at the front end of the machine, for the insertion of another bolt or screw preparatory to the next succeeding operation, said actuation of the hand-lever, through link $K^4$, will actuate lever $K^2$ in the direction to slide or reciprocate rod or bar K rearwardly away from the operator, resulting in the operation of the clutch-lever to establish operative connection between driving-pulley $H^2$ and shaft H, and thereby decrease the speed of feed or guide-wheel G', as required, to feed the work toward the cutter during the threading or cutting operation.

The means employed for actuating sliding-rod or bar K forwardly or toward the operator, upon the completion of the cutting-operation, to operate clutch-lever $K^2$ to operatively disconnect driving-pulley $H^2$ from shaft H, and establish operative connection between said shaft and pulley $H^3$, comprises a spring $K^5$ secured, at one end, to the sliding-rod or bar and attached, at its opposite end, to any stationary support such, for instance, as an arm or bracket $a^2$ supported from the machine-bed. Sliding-bar or rod K is, however, locked in its rearwardly actuated position to maintain operative connection between driving-pulley $H^2$ and shaft H by means of a vertically-movable bar, L, that extends up and down through the machine-bed, through a corresponding perforation $a^3$ in a block $a^4$ supported a suitable distance above the machine-bed by a bracket or standard $a^5$ rigid with the bed, and extends through a corresponding perforation $a^6$ in an ear $a^7$ of arm or bracket $a^8$ below the machine-bed and rigid with the latter, locking-bar L being adapted to engage, during the operative connection of pulley $H^2$ and shaft H, the forward end of a collar $K^6$ rigid on reciprocating-rod or bar, K, the locking-bar being held in such engagement by a coil-spring L' mounted and confined upon said bar between the bottom of the machine bed and a shoulder or collar, $L^2$, rigid on the bar. Locking-bar L is supported by means of lateral arms or pins $l$ with which said bar, above block $a^4$, is provided. The arrangement of parts is such that bar L, by means hereinafter described, shall be automatically elevated during the cutting operation and shall be caused to disengage collar $K^6$ on reciprocating-rod or bar K immediately upon the completion of the cutting or threading operation, permitting spring $K^5$ to perform its function of actuating rod or bar K forwardly as shown in dotted lines Fig. 1, to actuate the clutch-lever to interrupt operative connection between driving-pulley $H^2$ and shaft H and establish operative connection between said shaft and driving-pulley $H^3$.

It will of course be understood that the work-holding spindle, hand-lever $B^2$ and lever $K^2$ will be actuated to the position shown in dotted lines, Fig. 1, during the cutting operation, the feeding of the work toward the cutter by means of feed or guide-wheel G' actuating said parts into the position just indicated. Hence, lever $K^2$ will not interfere with the forward actuation of sliding-rod or bar K by means of spring $K^5$, but arm $K^3$ on said bar or rod will be brought into proper position relative to lever $K^2$ for the rearward actuation of said rod or bar preparatory to the commencement of the next succeeding operation.

The means employed for automatically elevating bar L during the cutting or threading operation, hereinbefore referred to, comprises a reciprocating-bar or slide M that is located in the same plane and arranged in line with the work-holding spindle, and is supported by and has suitable bearing in boxes rigid with elevated block $a^4$. The arrangement of parts is such that the inner or forward end of reciprocating-bar or slide M is engaged by the free extremity of the point of the bolt or screw to be threaded when the latter is in proper position relative to the cutter at the commencement of the cutting operation and is held in engagement with the point of the bolt or screw by means of a spring, M', attached, at one end, to block $a^4$ and, at its opposite end, to a head $m$ adjustably mounted upon bar or slide M and held in the required adjustment by means of nuts $m'$. On the other hand, the bolt or screw to be operated upon, is held in proper position relative to the cutter and with the point of the bolt or screw engaging the inner or forward end of bar or slide M, by means of a weight, O, at the rear of the machine and attached to a cord, strap, chain or cable, O', that leads over a pulor sheave $O^2$ (supported from an arm or bracket $a^9$ rigid with the machine-bed) and is fastened, at its other end, to hand-lever $B^2$. Slide-head $m$ is provided with a pair of rearwardly-projecting arms or dogs $m^2$ that, on top, are inclined or beveled downwardly, as at $m^3$, said beveled or inclined portions of the dogs being adapted to engage the under side of lateral arms or pins $l$ of bar L and elevate the latter, the arrangement of parts being such that at the commencement of the cutting or threading operation pins or arms $l$ of locking-bar L shall engage the lower end of beveled or inclined portion of dogs $m^2$ of the head of slide M so that when the latter is reciprocated rearwardly by the feed of the work inwardly, during the cutting operation, locking-bar L will be elevated, and when said bar at the completion of the cutting or threading operation, has been elevated above collar $K^6$ on sliding-rod or bar K, the latter will be free to be actuated by spring $K^5$ as hereinbefore indicated. The position of the work and slide M at the completion of the cutting or threading operation is shown in Fig. 3.

Another feature of my invention consists in the means employed for adjusting feed-wheel or guide G' relative to the work to be operated upon. The means employed are shown very clearly in Figs. 3 and 4, wherein the hub of said wheel is made of a separate piece from the wheel-proper, the latter being secured to its hub against upward displacement, by means of bolts 10 that extend through elongated holes 11 in the wheel-proper and engage correspondingly threaded holes 12 in the hub. The hub is provided with an upwardly-projecting lug 13 that extends through a slot 14 in the wheel proper, said slot being arranged concentric with the axis of the wheel. Lug 13, upon opposite sides, is adapted to be engaged by the free-end of the shank of a bolt or screw, 15, that extends through a correspondingly perforated upwardly-projecting lug 16 on the wheel proper at the adjacent end of said slot. By the construction just described, it will be observed that the wheel-proper of guide G', may be turned upon its hub in the one direction or the other, according as the one or the other of bolts or screws 15 is backed, and the guide is secured in the desired adjustment by tightening up the bolt or screw not backed, the elongation of bolt-holes 11 in the guide accommodating the adjustment aforesaid.

R represents a worm-wheel that is supported in any suitable manner above the point at which the work is held, said worm-wheel being adapted to mesh with the threads of the bolt or screw to be operated upon and constituting a top-guide for the work, preventing upward displacement of the work during the cutting or threading operation.

What I claim is—

1. In a machine for providing, with a threaded or gimlet-point, bolts or screws having a threaded shank, the combination with the work-holding-spindle, and means for suitably rotating said spindle, of a worm-wheel, or wheel having a threaded or toothed periphery, adapted to mesh with the threads on the shank of the bolt or screw to be operated upon, and means for suitably rotating said toothed or threaded wheel to feed or guide the work toward and hold the same against the cutter, substantially as set forth.

2. In a machine for providing, with a threaded or gimlet-point, bolts or screws having a threaded shank, the combination with the horizontal work-holding spindle, vertical cutter-spindle, cutter on the cutter-spindle, and means for suitably rotating said spindles, of suitable means for feeding or guiding the work as required relative to the cutter, and a worm-wheel supported above the cutter and adapted to mesh with the threads on the shank of the bolt or screw to be operated upon and prevent upward displacement of the work, substantially as set forth.

3. In a machine for providing bolts or screws with threaded or gimlet-points, the combination with a rotating work-holding spindle suitably supported, means for driving said spindle, a lever $B^2$ for reciprocating said spindle, cutter and cutter-spindle, of an upright shaft, G, guide or feed-wheel $G'$ operatively mounted upon said shaft, a driving-shaft, H, operatively connected with said upright-shaft, and driving-pulleys $H^2$, $H^3$, having different diameters, reciprocating-bar K, means operatively connected with said bar for causing the one or the other of said pulleys to operate the driving-shaft according as said bar is reciprocated in the one direction or the other, suitable means for actuating said reciprocating-bar into position to establish operative connection between the driving-shaft and the pulley having the largest diameter, suitable means for locking said reciprocating bar in said position, suitable means adapted to be actuated by the work during the cutting operation for actuating said locking means to unlock, and a spring acting to retain said reciprocating-bar in position establishing operative connection between the driving-shaft and pulley having the smallest diameter, the parts being arranged substantially as and for the purpose set forth.

In testimony whereof I sign this specification, in the presence of two witnesses, this 24th day of January, 1893.

WILLIAM R. WILBUR.

Witnesses:
C. H. DORER,
WARD HOOVER.